Feb. 19, 1957
H. B. VAN DORN
2,781,661
RACE-CONTOUR SCANNING GAGE
Filed Feb. 8, 1954
3 Sheets-Sheet 1
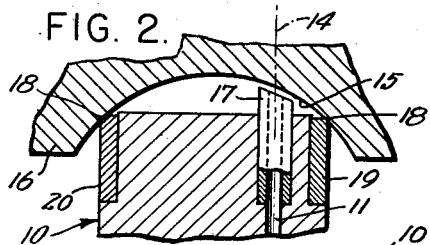
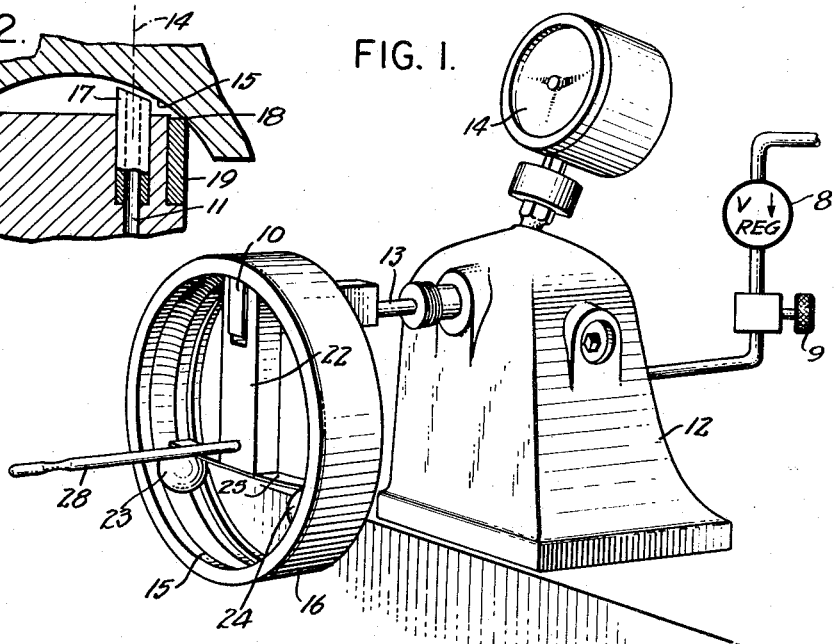
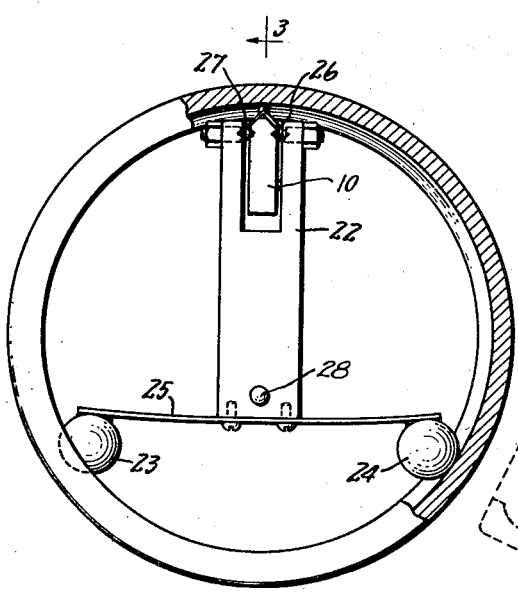
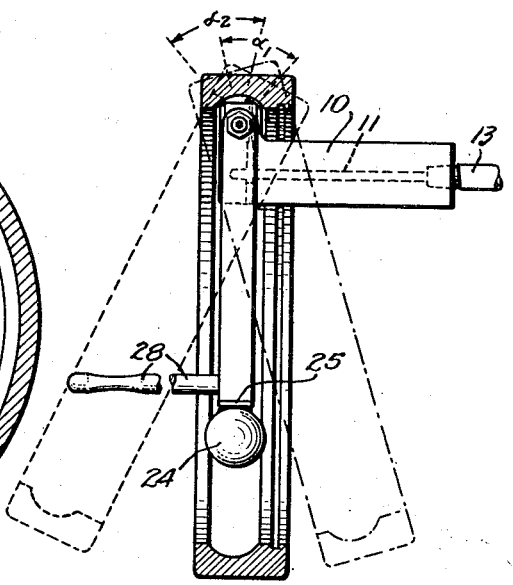
INVENTOR
HORACE B VAN DORN
BY
*Mitchell + Bechert*
ATTORNEYS Feb. 19, 1957 H. B. VAN DORN 2,781,661
RACE-CONTOUR SCANNING GAGE
Filed Feb. 8, 1954 3 Sheets-Sheet 2

INVENTOR
HORACE B. VAN DORN
BY
Mitchell & Bechert
ATTORNEYS

Feb. 19, 1957 H. B. VAN DORN 2,781,661
RACE-CONTOUR SCANNING GAGE
Filed Feb. 8, 1954 3 Sheets-Sheet 3

INVENTOR
HORACE B. VAN DORN
BY
*Mitchell & Bechert*
ATTORNEYS

United States Patent Office 2,781,661
Patented Feb. 19, 1957

2,781,661

RACE-CONTOUR SCANNING GAGE

Horace B. Van Dorn, New Britain, Conn., assignor to The Fafnir Bearing Company, New Britain, Conn., a corporation of Connecticut Application February 8, 1954, Serial No. 408,849

15 Claims. (Cl. 73—37.9)

My invention relates to gaging means for measuring and checking spherical, toroidal, spheroidal and the like surfaces, as, for example, concave surfaces of anti-friction bearing raceways. This invention represents an improvement over that disclosed in my U. S. Patent 2,636,380, issued April 28, 1953.

It is an object of the invention to provide an improved device of the character indicated.

It is another object to provide an improved apparatus for checking the form and contour of a surface of the character indicated.

It is also an object to provide a device for rapidly checking the radius of a generally spherical surface.

It is a specific object to provide improved means for checking raceways in inner or outer rings of anti-friction bearings.

It is a further object to provide an air-operated gage meeting the above objects.

It is another specific object to provide for scanning two-dimensional contour scanning in a ball-bearing raceway.

Other objects and various features of the invention will be pointed out or will occur to those skilled in the art from a reading of the following specification in conjunction with the accompanying drawings. In said drawings, which show, for illustrative purposes only, preferred forms of the invention:

Fig. 1 is a perspective view of a gage incorporating features of the invention and shown in position to probe the raceway of a ball-bearing outer ring;

Fig. 2 is an enlarged fragmentary view of the gage opening with respect to the raceway section being probed, all as viewed in the plane 3—3 of Fig. 3;

Fig. 3 is an end-elevational view of the gaging parts and ring of Fig. 1, with part of the ring sectioned in the central plane of the raceway in order to display details of the supporting structure;

Fig. 4 is a view in side elevation of the gage part shown in Fig. 2 and with the ring shown in section in the plane 3—3 of Fig. 3;

Figure 5:
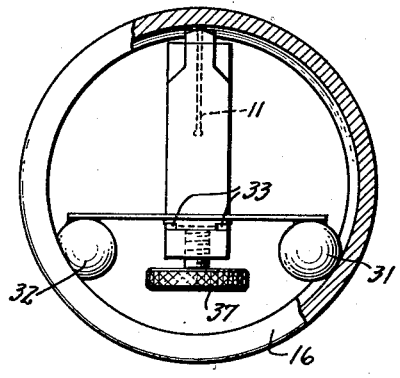
Fig. 5 is a view similar to Fig. 3, but showing a modification.

Briefly stated, my invention contemplates an air-operated gaging device for probing ball-bearing raceway surfaces for surface irregularities. The invention departs from the structure disclosed in the above-mentioned patent, in that provision is made for "scanning" the race groove, that is, for selectively placing the gage opening opposite raceway areas variously displaced from the central plane of the raceway groove. The supporting means which makes possible such "scanning" of the race contour involves a mechanical suspension constraining movement (of the ring being gaged) essentially to one plane, which plane is preferably the plane of support provided by two work-support areas closely adjacent the blast opening and on opposite sides thereof. In one general form to be described, the mechanical suspension which permits scanning involves a pivoted assembly, with a pivotal axis transverse to said plane and located near the blast opening. In another general form, elongated guide means co-acting between the scanning suspension and the gage block provide the necessary limitation on scanning movement.

Referring to Figs. 1 to 4 of the drawings, my invention is shown in application to a gage member 10 having an internal passage 11 communicating with an air-supply head 12 of otherwise conventional design. The air supply may include pressure-regulating means 8 furnishing, upstream from a restrictive orifice 9, a substantially constant supply of pressurized air. Downstream from said orifice 9 a gage-supply pipe 13 may communicate directly with the gage passage 11, and a pressure indicator 14 may directly display the pressure in supply line 13. The internal passage 11 may terminate at a blast opening or nozzle 17 on one side of the gage member 10 and directed generally away from said member 10 on a blast axis designated 14 in Fig. 2. In order that the gaging operation shall have utmost sensitivity, I prefer that the blast opening 17 shall be located as closely as possible to the surface 15 to be observed. In the form shown, the surface 15 is concave spheroidal, as in the case of the ball raceway of an outer bearing ring 16. In order that the blast opening 17 may be close to the contour of surface 15, said opening may be provided at the end of a tubular projection (as shown), which may be a hypodermic needle fitted into the base 10, and ground off at the end for substantially parallel conformity with the curvature to be observed. I prefer that support of the gage 10, with respect to the surface 15 to be probed, shall be such as to limit the spacing of the blast opening from the surface 15 to substantially no more, and preferably less, than the diameter of the blast opening.

For permanence and reliability of positioning the blast nozzle 17 with respect to the surface 15, I provide two essentially point-support areas 18 angularly spaced about the blast opening, and preferably on opposite sides thereof. These point-support areas 18 may be locally ground-off corners of hardened inserts 19—20, as of tungsten carbide, in the gage block 10; both point support areas 18 preferably lie in a central plane of symmetry which also includes the blast axis 14, so that changes in race (toroid) diameters will not affect the curvature reading.

For utmost reliability in gaging, I prefer that the blast opening 17 shall be urged for orientation substantially radially with respect to the elemental area being gaged; by radial, I mean with respect to the axis of the bearing ring, and preferably in the vertical radial plane including said axis. In the form shown, the supporting means includes a downwardly projecting part 22 carrying at its lower end two laterally spaced work-contact feet 23—24 connected to projection 22 by means of a transverse spring 25. The feet 23—24 are preferably symmetrically spaced on opposite sides of the support plane defined by points 18 and by the blast axis 14; the feet 23—24 may conveniently be balls, which, for greater stability, are preferably of greater radius than the transverse-section radius of the race 15, so that each ball may locate on the race rim rather than in the bottom of the race groove. In accordance with the invention, means are provided for permitting the selective displacement of the supported ring section substantially in said plane. Figs. 3 and 4 show that the desired selective displacements may be effected by a pivoted suspension, involving ball-pivot bearings 26—27 connecting the forked end of projection 22 to the gage head 10 near the blast opening.

In use, a bearing ring 16 is easily inserted in the gage by first applying the feet 23—24 in the race 15, by then lifting the ring 16 to deflect spring 25, and by inserting the gage head or blast nozzle in the supported part of the race 15. The ring may then be released, and the meter 14 may read above or below a pre-calibrated pressure level, depending upon how the gaged surface 14 deviates from a prescribed contour. A handle 28 secured to the projection 22 may facilitate tilting the ring 16, as through a first angle α1, to scan the race for the extent designated in Fig. 4; this angular extent will be understood to be predominantly to one side of the central radial plane of the raceway 15 and at the same time to include said central radial plane.

Sectional probing may be accomplished upon actuation of handle 28 through the angle α1, and circumferential probing may be effected upon manual rotation of the ring with respect to the gage. For probing through angle α2 on the other side of the central vertical plane of symmetry of the ring 16, said ring 16 need only be removed from the gage, turned over and remounted, as will be understood. The total angular coverage of the race section may, as suggested in Fig. 3, thus substantially exceed either of the angles α.

Figure 6:
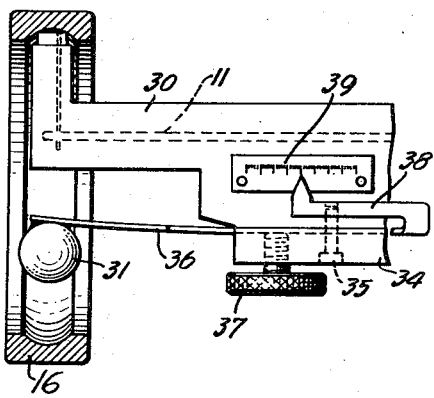
Fig. 6 is a right-side elevation of the parts shown in Fig. 5, the ring being sectioned in the vertical plane of symmetry.

In Figs. 5 and 6, I show a modification in which cross-sectional scanning is made possible through sliding parts guided by guide means aligned with the plane of support defined by the blast axis and by the two point-support areas 18. The gage block 30 may thus be essentially as described at 10 for Figs. 1 to 4, but the projecting means for supporting the work-engaging feet 31—32 may be a separate assembly 36 guided in elongated ways 33 in the gage block 30. The ways 33 may be defined by an elongated groove in a bottom cap or channel member 34, secured as by means 35 to the gage block 30 and guiding the resilient end of projection 36 for movement essentially in the plane of points 18 and blast axis 14. If desired, manually adjustable means, such as a setscrew 37, may bind the slidable parts together for any given adjustment and may thus hold the ring 16 with respect to blast axis 14, for circumferential probing of a given elevational part of the race contour. To facilitate such adjustment, I show indicator means including a needle 38 carried by slidable projection 36 and indicating against the scale 39 on the gage block 30 the extent of lateral adjustment. Gage operation is otherwise the same as described for Figs. 1 to 4.

Figure 7:
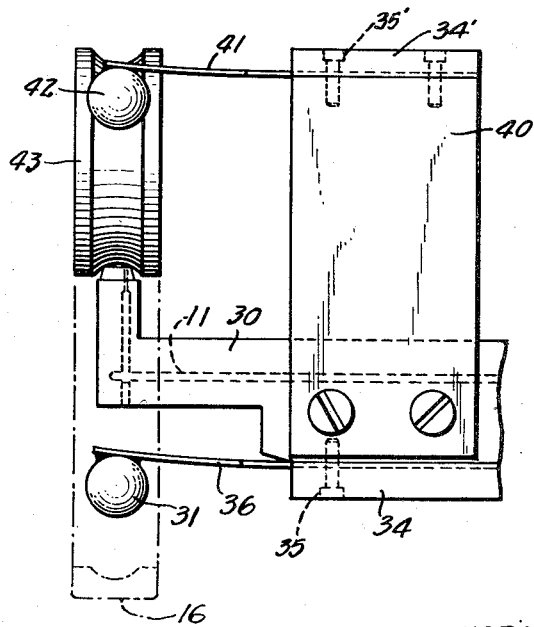
Fig. 7 is a view similar to Fig. 6, but showing a modification.

In Fig. 7, I show a slight modification in which the gage block 30 additionally includes frame means 40 for supporting a further slidable resilient projection 41, with piloting feet at 42, to locate an inner-bearing ring 43 symmetrically with respect to the described blast axis 14. As for the case of feet 31—32, the feet 42 are preferably provided on opposite sides of the central vertical plane of symmetry, and a removable guide cap 34', secured by means 35' to block 40, may constrain scanning movement as for slide 36.

Figure 8:
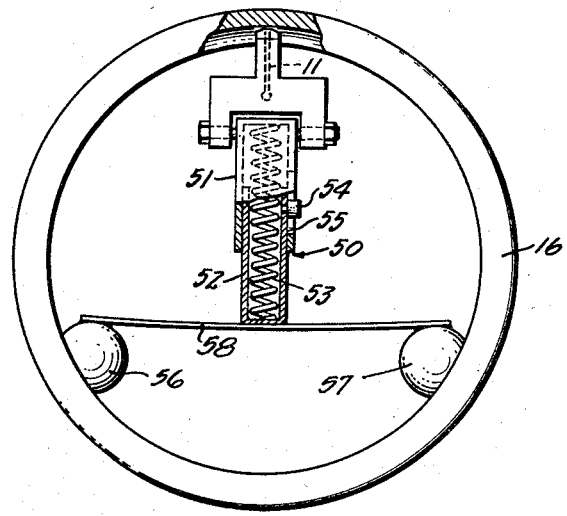
Fig. 8 is a view in end elevation of another form of gaging device incorporating features of the invention.

In Fig. 8, the arrangement may essentially resemble that described in Figs. 1 to 4, except that for purposes of facilitating insertion of a ring 16 to be gaged, the projecting part or pivoted assembly 50 may comprise two telescoping parts 51—52, with resilient means 53 urging the same apart, and with key means 54 carried by one of the parts, say the outer projecting part 52, and riding in an elongated slot 55 in the other part 51 for limiting movement essentially only to longitudinal projection. Piloting feet 56—57 may, as previously described, be secured to transverse spring means 58 carried at the base of part 52.

Figure 9:
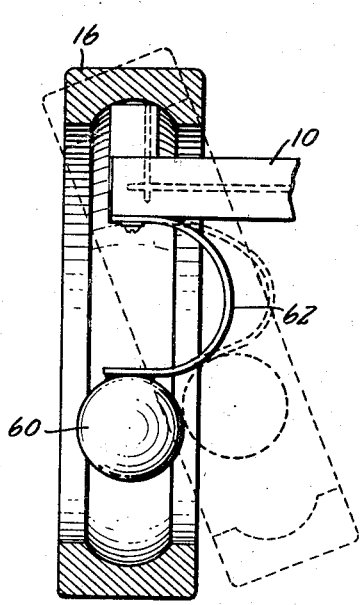
Figs. 9 and 10 are respectively side and end elevations of a further modified gaging device.
Figure 10:
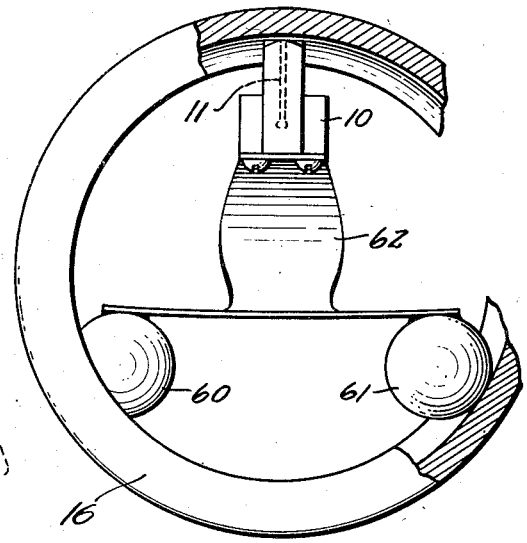

In Figs. 9 and 10, the resilient support of the work-engaging feet 60—61 is achieved without pivoted or sliding mechanism, merely by the employment of a single leaf spring 62 connecting the feet 60—61 to each other and to the gageblock 10. The spring 62 may be semi-circular and is preferably wide enough to resist lateral displacement and to confine movement of the supported ring 16 essentially to the plane of support represented by points 18 and blast axis 14, all as described more fully in connection with the other embodiments.

It will be seen that I have described an important advance over my previous structure, in that any part of the race section may now be scanned for surface irregularities, without the need for inserting a new gage block having a different offset from the central radial plane of the bearing being gaged. My gage may be observed for surface irregularities, or it may be calibrated to read race-section radius directly. Regardless of the form employed, the ring may be accurately located with respect to the blast axis of the gage nozzle, thus preserving accuracy of measurement, regardless of the section or of the race elevation being probed. The scanning support lends itself to the easy probing of inner and outer bearing rings and, as in the case depicted in Fig. 7, both inner and outer bearing rings and, as in the case depicted in Fig. 7, both inner and outer rings for the same ultimately assembled ball bearing may be scanned in the same gaging mechanism.

While I have described my invention in detail for the preferred forms shown, it will be understood that modifications may be made within the scope of the invention as defined in the claims which follow.

I claim:

1. In a gaging device of the character indicated, a gage member having an internal air-supply passage with a gage opening on one side thereof, said opening having a blast axis directed away from said member, support means including two support areas spaced on opposite sides of the blast axis of said gage opening and in a first support plane for abutting a curved surface to be gaged and for positioning said opening in spaced relation with said surface, said areas being axially behind the discharge end of said opening in the sense of said blast axis, whereby said opening may project beyond the plane of said supporting means, and whereby a first axis of stability for orientation of said opening may be defined, further support means including two essentially point-support areas straddling said first plane, means movably guiding said further support means with respect to said gage member and constraining said further support means for movement generally parallel to said first plane and at a substantially constant distance from said gage opening, pneumatic supply means for said passage, and pressure-responsive measuring means in communication with said passage.

2. In a gaging device of the character indicated, a gage member having an internal air-supply passage in communication with a gage opening on one side of said member and having a blast axis directed away from said member, supporting means on said member including two support areas angularly spaced about said blast axis for abutting a concave curved surface of a piece to be gaged, said areas being axially behind the discharge end of said opening in the sense of said blast axis, whereby said opening may project toward and be spaced from the surface to be measured, resilient means carried by said member and including a part projecting into contact with the piece having the curved surface to be measured and positioned to urge said supporting means and the piece together, said latter projecting part including work-contact areas straddling a plane passing through both said support areas, and guide means guiding said projecting part for movement generally in said first-mentioned plane, whereby said workpiece may be variously inclined with respect to said blast axis and said blast axis may therefore scan a section of the surface to be gaged, pneumatic-supply means for said passage, and pressure-responsive measuring means in communication with said passage.

3. A gaging device according to claim 2, in which said projecting part includes a pivotal connection to said gage member, the pivot axis being generally transverse to said first-mentioned plane, whereby said projecting part is constrained to substantially arcuate movement in said first plane.

4. A gaging device according to claim 2, in which said projecting part includes an elongated spring with elongated guide means, and in which said first-mentioned guide means is carried by said gage member for constraining the movement of said projecting part essentially to movement in said first plane.

5. A gaging device according to claim 2, in which said projecting part supports said work-contact areas on that side of said first-mentioned support areas which is located away from said blast opening.

6. A gaging device according to claim 2, in which said projecting part supports said work-contact areas on that side of said first-mentioned support areas located nearer to said blast opening.

7. In a gaging device of the character indicated, a gage member having a blast opening on one side thereof and discharging away from said member on a blast axis, two support areas on said gage member on opposite sides of said blast opening for supporting said blast opening in spaced relation with a surface to be gaged, a generally semi-circular leaf spring having one end fastened to said gage member and including at the other end work-supporting means for engaging another part of the surface to be gaged and for resiliently urging said first-mentioned support areas against the surface to be gaged.

8. A device according to claim 7, in which said leaf spring is anchored to said gage member against rotation and is bent in its arc substantially in the radial plane including said first-mentioned support areas, whereby movement of said further supporting means is constrained essentially to movement in said plane.

9. In a gaging device of the character indicated, a gage member having a blast opening on one side thereof and discharging away from said member on a blast axis, two support areas on said gage member on opposite sides of said blast opening for supporting said blast opening in spaced relation with a surface to be gaged, a resilient supporting assembly pivoted to said gage member on an axis generally transverse to the radial plane including said first support areas, said pivot axis being located near said blast opening, said pivoted assembly further including mutually guided telescoping parts, resilient means urging said parts apart, and further work-contacting means carried by the resiliently projected one of said parts.

10. A device according to claim 9, in which said telescoping parts are keyed against relative rotation.

11. A gaging device according to claim 9, in which said blast axis is nearer to one of said point support areas than to the other, whereby for a full symmetrical swing of said resilient means in said plane, said gage may probe for an arc including the central plane of a raceway and predominantly to one side thereof so that, upon probing for one installed position of a race ring and, upon then probing for another installed position of the race ring in reversed orientation, essentially the full race contour may be probed for a maximum cross-sectional arcuate extent.

12. In a gaging device for checking race contour in an antifriction bearing ring, a source of fluid pressure, a gage member having an internal passage fed from said source and opening on a blast axis at a gaging point on said member, supporting means including two essentially point-support areas spaced about said blast axis on generally opposite sides of the opening at said gaging point, said opening projecting beyond a plane including said supporting means, whereby said supporting means may pilot said opening in proper spaced relation with a bearing raceway and with minimum ambiguous undulation due to surface irregularities, resilient means carried by said member and engaging another part of said bearing ring, means constraining said resilient means for movement essentially parallel to the radial plane of said point-support areas, and manually operable securing means for holding said resilient means in a given angularly adjusted position in said plane.

13. In a gaging device for checking race contour in an antifriction bearing ring, a source of fluid pressure, a gage member having an internal passage fed from said source and opening on a blast axis at a gaging point on said member, supporting means including two essentially point-support areas angularly spaced about said blast axis on generally opposite sides of the opening at said point, said opening projecting beyond a plane including said supporting means, whereby said supporting means may pilot said opening in proper spaced relation with a bearing raceway and with minimum ambiguous undulation due to surface irregularities, resilient means carried by said member and engaging another part of said bearing ring, means constraining said resilient means for movement essentially parallel to the radial plane of said point-support areas, and indicator means including cooperating needle-and-scale elements carried on said gage member and on said resilient means for indicating the instantaneous transversely displaced location of said resilient means with respect to said blast axis.

14. In a gaging device of the character indicated, a gage block having a gage opening on one side thereof with a blast axis directed away from said member and having an internal air-supply passage communicating with said blast opening, two work-support areas on opposite sides of said blast opening and essentially in a single plane including that of said blast opening, first resilient means constrained for movement essentially in said plane and including two spaced-apart work-contacting areas straddling said plane on one side of said blast opening, and further resilient means constrained for movement essentially in said plane and including two spaced-apart work-contacting areas straddling said plane; whereby inner and outer bearing rings for assembly into the same ultimate bearing, and therefore to be probed for similar concave raceway sections, may be selectively and successively gaged by said device.

15. In a gaging device of the character indicated, a gage member having a blast opening on one side thereof and discharging away from said member on a blast axis, support means including two support areas spaced on opposite sides of said blast opening and in a first support plane for abutting a curved bearing ring surface to be gaged and for positioning said blast opening in clearance-responsive relation with said surface, whereby a first axis of stability for orientation of said blast opening may be defined, further support means including two support areas straddling said first plane and for engaging spaced parts of the bearing ring to be gaged, means movably guiding said further support means with respect to said gage member and constraining said further support means for movement generally parallel to said first plane, said last-defined means including means resiliently urging said last-mentioned support areas in the direction to firmly position the blast opening of said member in probing relation with the ring surface being gaged, and pressure-responsive indicator means in communication with said blast opening.

References Cited in the file of this patent

UNITED STATES PATENTS

| 2,088,362 | Blazek et al. | July 27, 1937 |
| 2,392,016 | Wattebot | Jan. 1, 1946 |
| 2,636,380 | Van Dorn | Apr. 28, 1953 |
| 2,669,864 | Brewster | Feb. 23, 1954 |
| 2,687,038 | Aller | Aug. 24, 1954 |